United States Patent [19]

Hodges et al.

[11] Patent Number: 4,864,146

[45] Date of Patent: Sep. 5, 1989

[54] UNIVERSAL FIRE SIMULATOR

[75] Inventors: Steven E. Hodges, Eugene, Oreg.; Mark T. Kern, Goleta, Calif.

[73] Assignee: Santa Barbara Research Center, Goleta, Calif.

[21] Appl. No.: 76,964

[22] Filed: Jul. 23, 1987

[51] Int. Cl.$^4$ ............................................... G21G 4/00
[52] U.S. Cl. .............................. 250/504 R; 250/494.1; 250/495.1; 340/515; 340/578
[58] Field of Search ............ 250/504 R, 504 H, 495.1, 250/494.1, 493.1, 554; 340/578, 515; 315/183; 362/228, 231

[56] References Cited

U.S. PATENT DOCUMENTS

| | | | |
|---|---|---|---|
| 3,143,161 | 8/1964 | Graves et al. | 340/515 X |
| 3,161,863 | 12/1964 | Deziel | 340/515 |
| 3,309,881 | 3/1967 | Beerman | 374/2 |
| 3,383,902 | 5/1968 | Gragin et al. | 374/2 |
| 3,541,549 | 8/1968 | Graves | 340/515 X |
| 3,802,249 | 4/1974 | Clawson | 374/2 |
| 4,418,338 | 11/1983 | Burt | 340/515 X |
| 4,624,641 | 11/1986 | Gallagher | 273/310 X |
| 4,641,227 | 2/1987 | Kusuhara | 362/231 |
| 4,681,434 | 7/1987 | Kepple | 356/45 |

Primary Examiner—Eugene R. LaRoche
Assistant Examiner—Seung Ham
Attorney, Agent, or Firm—W. C. Schubert

[57] ABSTRACT

A method and improved apparatus for generating and transmitting the distinguishing radiation characteristics of a fire, an ignition and fire, or an ignition without a fire, to a fire sensing system under test are disclosed. Varying radiant energy attributes of a fire, and in particular a hydrocarbon fire such as might be encountered in a vehicle fuel or engine compartment are safely generated by a blackbody transmitter 100, an ultraviolet transmitter 200 and an ignition flash transmitter 300, having appropriate radiation sources. The radiation sources may be conveniently assembled into a palm-sized radiation "head" 101. The transmitters may be selected sequentially to test installed fire sensing systems in aircraft or vehicles or during manufacture where the environment does not permit the use of an actual fire. The blackbody transmitter 100 has a random-noise generator 20 and amplifier 30, which drive a blackbody source 40 containing a heater wire 110 sealed in a reflective cavity with a carbon dioxide gas and water vapor mixture. The resulting emitted radiation 42 has characteristics of a flickering, 1200 to 1700 degrees Kelvin blackbody superimposed with $CO_2$ and $H_2O$ emission lines. The ultraviolet transmitter 200 uses the noise generator 20 to also drive, through a power amplifier 50, an ultraviolet source 60 which emits an ultraviolet radiation "spike" 62. The ultraviolet radiant energy output is adjusted to an amplitude with respect to the blackbody source in accordance with a ratio of such energy measured for an actual fire. The ignition flash transmitter 200 has a high voltage source 70 which fires a gas-discharge tube source 80 to simulate an ignition flash 82.

28 Claims, 4 Drawing Sheets

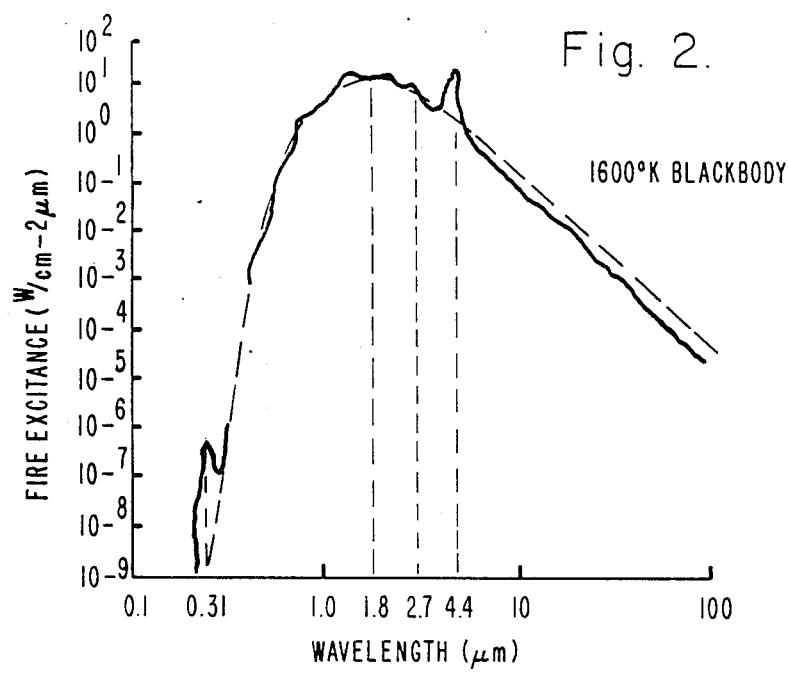
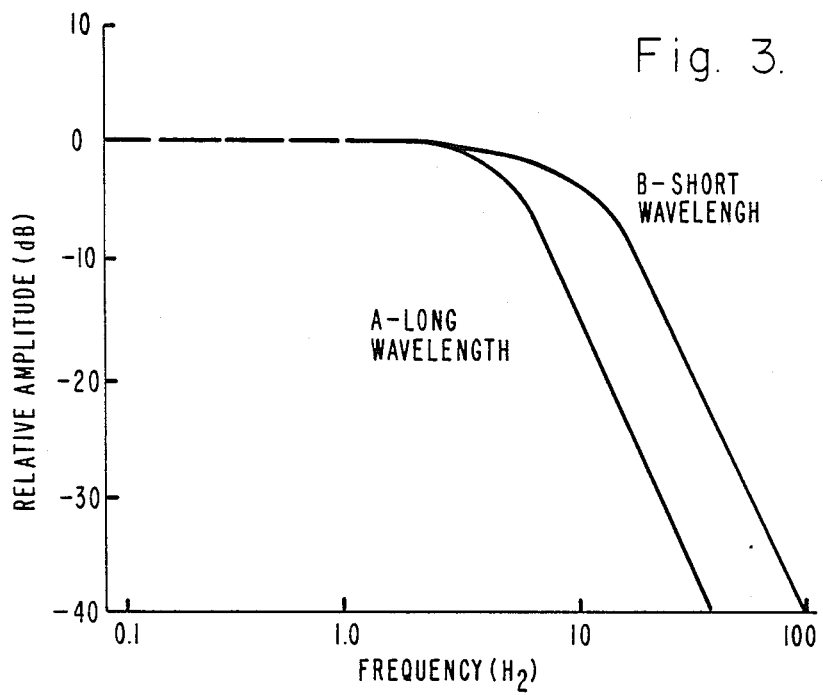

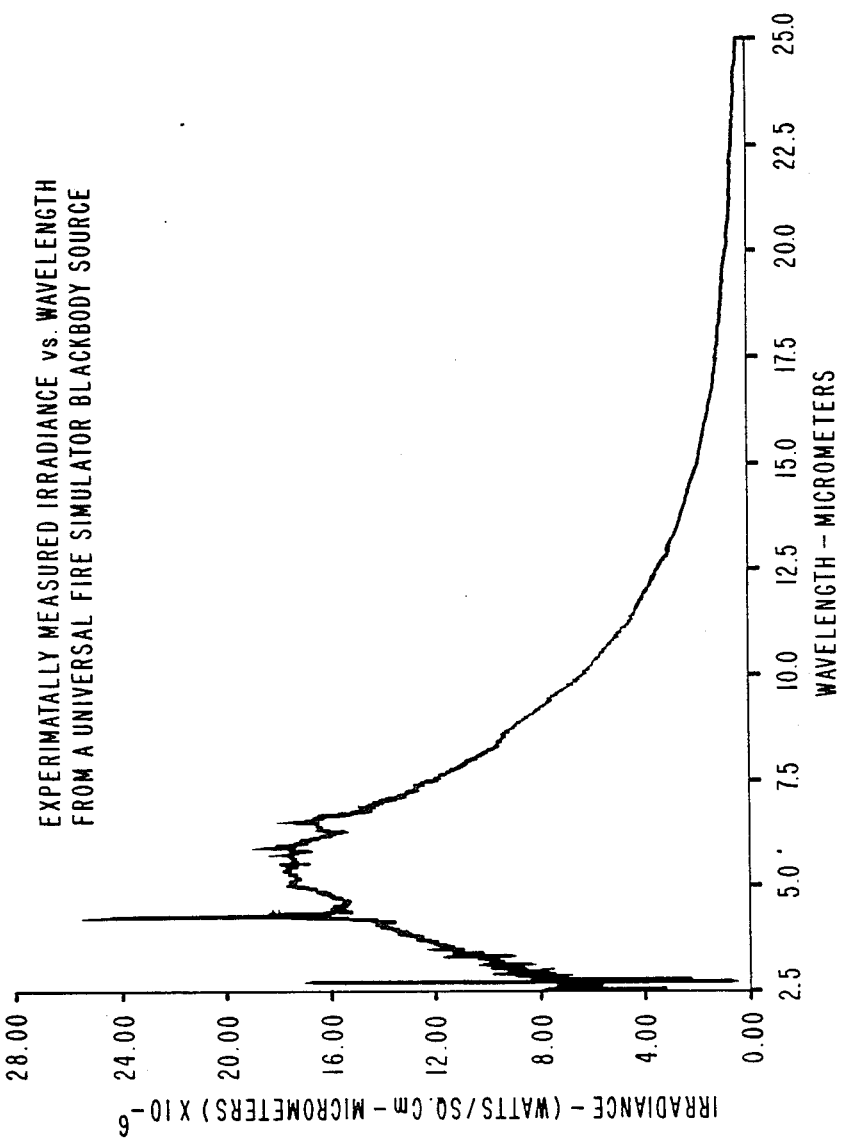

UNIVERSAL FIRE SIMULATOR

BACKGROUND OF THE INVENTION

1. Field of the Invention

The disclosed invention generally relates to fire simulation by emittance of radiation that simulates one or more distinguishing attributes of the radiant energy produced by a fire, and more particularly, is directed to fire simulation apparatus and methods for simulation of substantially all of the key attributes of a fire which distinguish it from other sources of radiation.

2. Description of the Technology

Fire simulators are used to check the operation of optical fire sensor systems which are in use in a variety of military and civil applications. The military, for example, deploys a number of such fire sensor systems in fighting vehicles to trigger fire-quenching Halon gas should the vehicle's crew compartment be subjected to an incipient fire from an armor piercing shell. Such systems are important in protecting the lives of vehicle occupants. Engine compartments in vehicles are also protected from fire by optical fire sensor systems. Aircraft "dry" bays, that is compartments not containing fuel, are protected by fire sensor systems which warn the crew of fire and may dispense fire-quenching material. Such sensing systems have many potential uses for protecting persons and equipment in closed areas from ignition and fire.

Fire simulating systems are used to test the operation in the field of installed fire sensor systems as well as operation on the test bench or at the factory. Checks of fire sensor systems for proper operation precedent to use under actual conditions must of course use simulated fire stimuli in most circumstances. Open flames cannot be used generally as a test source since flammables are often present. Fire sensors are designed to avoid response to non-fire stimuli, so it is not surprising that known simulators are narrowly designed to include only the principal fire-like stimuli upon which a particular sensor to be tested operates.

To test a fire sensor requires presenting it with one or more distinguishing features of a fire. The main distinguishing features of a fire are smoke, noise, light and heat. Fast-responding optical fire sensor systems respond to a fire's light and heat radiation. This radiation may roughly be divided into a region of ultraviolet and visible light, and infrared radiation.

In particular, the main distinguishing attributes of the radiant energy emitted by a glowing fire have been found by investigators to be: light and heat represented by 1200 degrees to 1700 degrees Kelvin blackbody radiation from about 0.4 to 25 micrometers wavelength; carbon dioxide and water vapor spectral radiation emission in bands mainly at about 2.7 and 4.3 micrometers wavelength; ultraviolet light from about 0.20 to 0.32 micrometers wavelength; and a flickering pattern, which is a change of emitted radiation varying in time. It has been found that the energy emitted is nearly constant for flickering frequencies of 0 to 5 Hertz and then rolls off roughly as the inverse of the flickering frequency.

A fire which glows yellow, such as burning wood for example, emits radiation having a characteristic blackbody shape, and the heat energy tends to dominate the light emissions. A natural gas fire which glows blue, also has characteristic blackbody radiation but the ultraviolet, $CO_2$ and $H_2O$ emissions tend to dominate the heat energy. Burning of different materials could be simulated by adjusting the relative amplitudes of radiation from manufactured sources of radiant energy which generate the light, heat and spectral emissions indicative of a fire.

Known optical fire sensor systems sense one or at the most two of the distinguishing features of a fire in order to perform detection. As a result, known fire simulators have catered specifically to individual fire sensor system technologies. While these simulators are satisfactory for the sensor systems they are designed to test, such systems, because they simulate only one or perhaps two key characteristics, are useful only to test a sensor system that operates on those particular characteristics.

A proliferation of various fire sensor system technologies has produced a need for a "universal" fire simulator which will test all of the currently deployed designs as well as systems with new technologies which are still not constructed or even conceived. Military services in particular, that have a variety of systems installed in aircraft and ground vehicles, could save time and expense by procuring one universal fire simulator with which to test and maintain all of their deployed systems.

The use of a universal fire simulator obviates the need to use an actual fire to test fire sensing systems even where possible, for example, in laboratory or field test-stand evaluation. Improved safety, cleanliness and dependability would result from the use of such a simulator.

A universal fire simulator would be especially useful if it were small enough to be held in the palm of one's hand, particularly while testing aircraft or vehicle-installed fire sensors. Frequently, fire sensors are installed in crowded compartments with only minimal access through hand-access holes.

A universal fire simulator which closely simulates a fire is useful in testing fire sensors which are particularly subject to environments which may produce false alarms. Such a system would have the ability to simulate all of the key distinguishing attributes of a fire so the features of a fire sensor system which prevent false alarms are exercised. Protecting against false alarms is of prime concern in most fire sensor systems. When automatic dispensing of fire quenching or retardant materials is included in the application, false alarms can be disastrous because of the possible damage to equipment from such materials. Inappropriate fire alarms which prompt action by aircraft or vehicle crew members are likewise not desirable.

None of the known fire simulating systems closely simulate all of the main distinguishing features of a fire or an ignition and fire, nor do they provide a basis for reducing the size of such simulating systems to a size that is usable in the restricted space and access of aircraft or vehicle compartments. Critical fire sensor systems, therefore, might not now be tested fully while installed.

A practical and reliable means for closely simulating all of the key attributes of a fire, particularly in a small, portable size, would constitute a major advancement in the art of fire simulation. Users of fire sensor systems could employ such a system to test more fully and verify the operation of a variety of fire sensor systems in the field, on the test stand or on the production line. It is likely that they could do so at reduced costs and with improved results over currently known fire simulating systems. The aim of the present invention is to help accomplish this major advancement in the art.

SUMMARY OF THE INVENTION

The disclosed invention provides a simulation of the key distinguishing attributes of a fire, both static and dynamic. It will enable designers, constructors and users of fire sensor systems to evaluate more fully the operation of their systems and to insure reliable sensor operation if an actual fire should occur.

The Universal Fire Simulator has sources for the generation and transmission of radiation in the ultraviolet, visible, and infrared spectral regions which are preadjusted to appropriate energy levels to reproduce the spectral energy distribution of a fire.

A coil of heating wire, heated by an electric current, generates and transmits a blackbody-type distribution of energy. The current is set for the blackbody temperature desired, for example, 1200 to 1700 degrees Kelvin.

Gaseous radiant emissions associated with a fire are generated and transmitted by heating a mixture of gases, of the types which are products of combustion, to emissive temperature. The mixture heating takes place in a sealed chamber which also serves as the reflector and housing for the blackbody heating wire. Simulation of a fire's flickering characteristic in the visible and infrared spectral region is provided by electrically modulating the heating wire with a source of random or "white" noise current, shaped by an electrical filter.

A source of ultraviolet radiation, for example an ultraviolet bulb, generates and transmits energy in a spectral region of 0.2 to 0.3 micrometers wavelength. Like the blackbody, it is also driven by a modulating electric current to produce a "spike" of time-varying ultraviolet energy.

A flash-tube source of radiant energy is provided to generate and transmit radiant energy having the radiation signature of an ignition flash. A discharge tube or photographer's flash bulb provides energy, predominantly in the visible and infrared spectrums, which simulates the distinguishing characteristics of an ignition flash. The discharge tube is fired by a stored source of high voltage, for example a charged capacitor or a simple "ring-up" circuit.

A control circuit is used to select radiation sources which simulate: (1) fire only, by energizing the said heater wire coil and ultraviolet bulb; (2) ignition flash only, by energizing the said discharge tube (or photographer's flashbulb); or (3) fire ignited by ignition flash, by energizing the said discharge tube, heater wire coil, and ultraviolet bulb sequentially.

This innovative system provides apparatus which can be compacted in size for ready transport to confined areas in which fire sensing and reacting equipment is housed for the purpose of testing such equipment with an appropriate simulation of a fire and ignition flash.

This invention teaches a method of generating and transmitting radiation stimuli which has the key attributes of a fire both statically and dynamically.

It is an object of this invention, therefore, to provide apparatus which closely simulates a fire which may be used, inter alia, to test fire sensing systems on the production line, in the field, or installed in vehicles, aircraft or the like.

Another object of this invention is to provide apparatus which is adjustable in the field to simulate fires, explosions, or fires resulting from explosions.

It is a further object of this invention to provide a method of generating radiant energy simulating key attributes of a fire or ignition in a convenient, portable and compact size that can be safely used to test fire sensing and reacting equipment in the engine or other compartments of vehicles or aircraft where the presence of flammables precludes the employment of actual fires.

An appreciation of other aims and objects of the present invention and a more complete understanding of this invention may be achieved by persons skilled in the art by referring to the following description and by referring to the accompanying drawing.

BRIEF DESCRIPTION OF THE DRAWING

FIG. 2 is an approximate spectral distribution of irradiance of a hydrocarbon pan fire which may be simulated by the Simulator of FIG. 1. This chart was constructed by reference to Linford, et al., "Optical Emissions from Burning Jet Fuel", J. Aircraft, 14, 5, May 1977. It displays the general shape of 1600 degree Kelvin blackbody radiation, with superimposed "spikes" of carbon dioxide and water vapor emission and a superimposed spike of ultraviolet radiation.

FIG. 3 is a diagram of Relative Amplitude of Hydrocarbon Fire Radiant Energy versus Frequency, showing the approximate "flicker" attribute of a hydrocarbon pan fire which may be simulated by the Simulator of FIG. 1.

FIG. 4 is a plot of experimentally measured irradiance from an embodiment of the disclosed Fire Simulator of FIG. 1 versus wavelength, displaying the general shape of blackbody radiation, carbon dioxide and water vapor emission bands and ultraviolet radiant energy.

DETAILED DESCRIPTION OF THE DISCLOSURE

Use of the disclosed Universal Fire Simulator methods and apparatus described herein, provides simulation for at least three situations for which operational fire sensing systems are designed: a fire, for example a fuel fire; a munitions ignition without an ensuing fire; and a munitions ignition followed by a fire.

For purposes of the following discussion, the term "visible spectral region" refers to radiation at wavelengths of about 0.35 to 1.0 micrometers. The term "ultraviolet spectral region" refers to radiation at wavelengths of about 0.2 to 0.35 micrometers. The term "infrared spectral region refers to radiation at wavelengths of about 1.0 to and beyond 6.0 micrometers.

Figure 1:
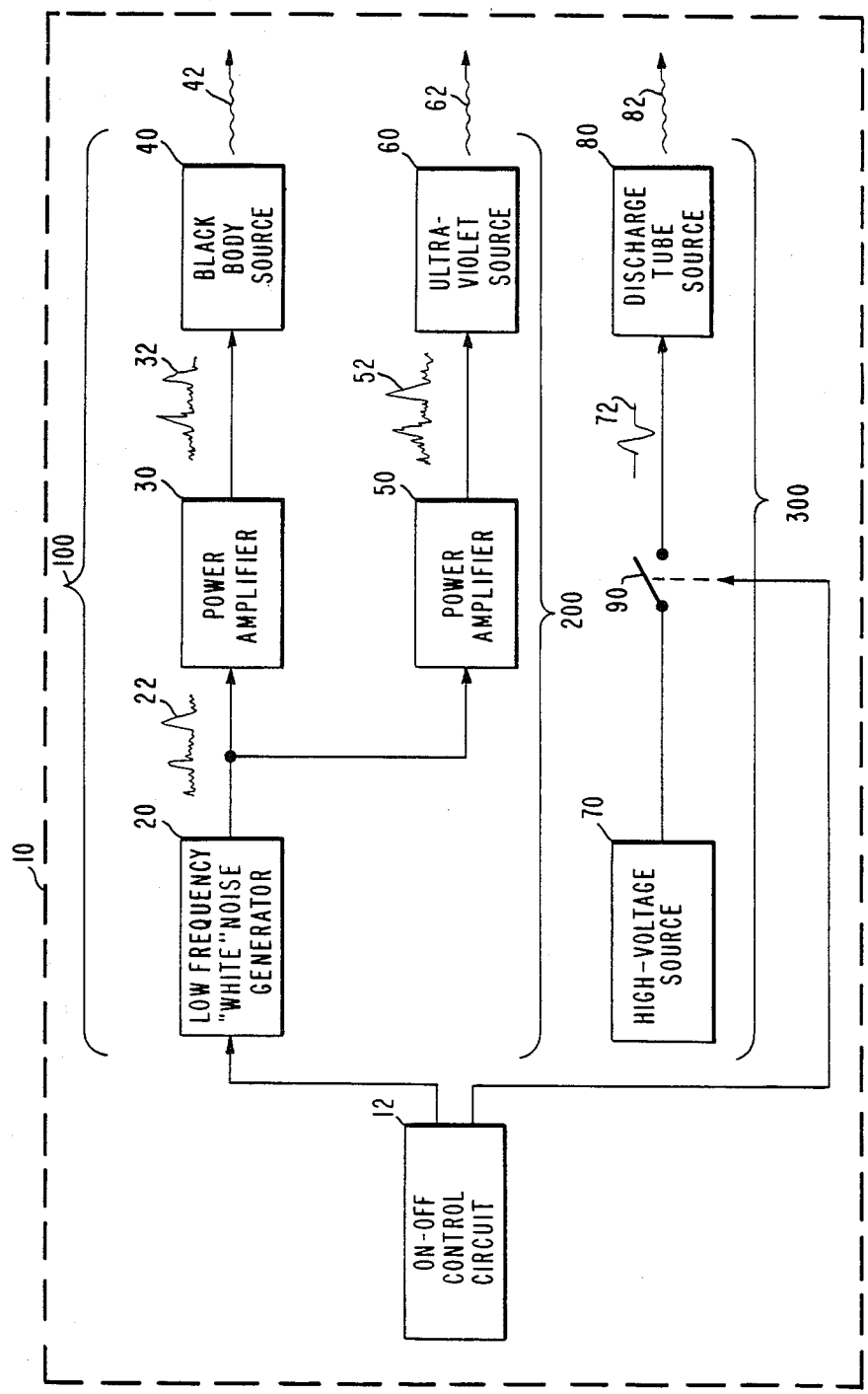
FIG. 1 is a block diagram of the Universal Fire Simulator.

The following discussion can be better understood by referring to FIG. 1 in conjunction with FIGS. 2 and 3.

Referring to FIG. 1, the various components of a preferred arrangement of a Universal Fire Simulator can be seen in block diagram. The fire simulator system 10 includes a blackbody transmitter 100 which generates and radiates blackbody radiant energy 42, which radiant energy also contains superimposed carbon dioxide and water vapor emissions in the infrared spectral region. The blackbody transmitter 100 includes a "white-noise" generator 20 of a type generally available commercially, a first power amplifier 30, of a type generally available commercially, and a blackbody source 40. An alternate type of "white noise" generator 20 may be obtained by amplifying a current passed through a zener diode.

Construction of a blackbody source is generally known by persons practiced in the art. Such a source may be constructed from heating wire coils mounted on an electrical insulator with appropriate heat-sinking and installed in an infrared-reflecting cavity. A further understanding of the arrangement of the blackbody source 40 may be had by referring to FIGS. 5 and 6 and the further description, infra.

The white-noise generator 20 is a source of random electrical signals 22 in the range from 0 Hertz (direct current) to about 100 Hertz. The signals 22 are amplified by the first power amplifier 30 and appropriately filtered by an electrical filter, producing amplified first signal currents 32 which heat the blackbody source 40. Heating excites the blackbody source 40 causing it to radiate energy in the visible and infrared spectral regions and varying in amplitude generally according to the waveform of the first signal current 32.

The first power amplifier 30 gain may be set to produce a current 32 which when modulated will heat the blackbody source 40 to a temperature of, for example, 1200 to 1700 degrees Kelvin. A curve of radiation versus wave length for a 1600 degrees Kelvin blackbody is included in FIG. 2. Radiation from the blackbody source 40 at temperatures near 1600° K. simulates one attribute of a hydrocarbon fire.

Still referring to FIG. 1, the varying amplitude of the first signal current 32 simulates fire flickering. The amplitude of the radiative output 42 from the blackbody source 40 versus its frequency can be made to simulate that of a fire such as the hydrocarbon fire depicted in curve A of FIG. 3 by appropriate choices in blackbody source 40 construction and filtering of first amplifier 30 output.

Referring to FIG. 3 there are shown two curves depicting the approximate flicker of a hydrocarbon pan fire. The curves were obtained from experimental data made in 1983 by K. Shamordola of Santa Barbara Research Center. Curve A describes the variation of relative amplitude of long-wave length radiation with frequency. Such wave lengths are generally in the near-infrared to far infrared spectral regions. Curve B describes the same phenomena for short-wave length radiation. Short wave lengths are generally those in the visible and ultraviolet spectral regions. The first and second signal currents 32, 52 are made to follow the relative amplitude versus frequency of such long wavelength curve and such short wavelength curve, respectively.

Referring again to FIG. 1, the blackbody source 40 is filled with a mixture of gases which include nitrogen and carbon dioxide. Water vapor may also be added to the mixture. These gases are heated within the source 40 and radiate energy at characteristic emission bands, for example, 2.7 and 4.3 micrometers. Such carbon dioxide and water vapor emission is another attribute of a hydrocarbon fire.

An on-off control circuit 12, of conventional design, controls the operation and selection of the blackbody transmitter 100. A human operator normally would select and activate the entire system 10 by means of the on-off control circuit 12, although automatic operation may be provided.

The system 10 further includes an ultraviolet transmitter 200 which generates and radiates energy in the ultraviolet spectrum. The white-noise electrical signals 22 generated by the white-noise generator 20 are amplified by a second power amplifier 50 and appropriately filtered by an electrical filter producing amplified second signal currents 52. The second signal currents 52 are used to drive an ultraviolet source 60 which primarily emits ultraviolet radiant energy 62, varying generally in accordance with the waveform of the amplified second signal currents 52. In conjunction with the waveform of the amplified second signal currents, the thermal mass of ultraviolet source 60 is selected so that the amplitude of ultraviolet radiant energy 62 varies with frequency, for example as depicted in FIG. 3, curve B.

The source 60 of ultraviolet radiant energy 62 may be an ultraviolet bulb similar to the type commercially available and used to erase EPROM (erasable-programmable) computer circuit ships. Other sources of ultraviolet radiation are a carbon arc or a fluorescent bulb without the fluorescent coating.

The gain of the second power amplifier 50 is set such that the peak energy produced by the ultraviolet source 60 is in the same ratio to the peak energy transmitted by the blackbody source 40 as is the peak ultraviolet energy to peak blackbody energy characteristic of a fire.

The operation of the ultraviolet transmitter 200 is selected and controlled by the on-off control circuit 12.

The system 10 further includes an ignition flash transmitter 300 which includes a high voltage power source 70 of a type generally commercially available or easily constructed by one practiced in the art, a switch 90 and a discharge tube source 80. The high voltage source 70 produces a momentary surge of electrical current, depicted by the waveform 72 when the switch 90 is closed. The current will cause the discharge tube source 80 to flash, emitting light and heat energy 82. The discharge tube source 80 may be a commercially available electronic flash device commonly used for photography. Alternatively, a steady source, having a color temperature of about 3000 degrees Kelvin, quickly exposed by a shutter may be used.

A steady source such as a tungsten filament lamp generating roughly 500 watts of total radiation could be exposed by a shutter which would produce a duration of less than 0.25 seconds of radiation having a rise time of one millisecond or less. Such a lamp source could be operated for just a few seconds during simulation to prevent overheating.

The ignition flash transmitter 300 is selected and controlled by the on-off control circuit 12 which acts to close the switch 90 when an ignition flash is to be simulated.

The simulation of munitions penetration of a vehicle compartment followed by a fire therein, may be obtained by regulating, through use of the on-off control circuit 12, the sequence and timing of selection and operation of the blackbody transmitter 100, ultraviolet transmitter 200 and ignition flash transmitter 300.

It should be clear to one practiced in the art that the disclosed invention may be adjusted to simulate the radiative output of most fires in the spectral bands currently used by known fire sensing systems. Calibration of the system 10 may be accomplished by use of a radiometric transfer standard, for example a bank of detectors having a variety of spectral responses. The relative radiation outputs of the transmitters 100, 200, 300 may be adjusted to match the properties of the fire to be simulated. The disclosed invention has the potential for use with respect to fire sensing systems not yet designed.

Referring now to FIG. 2, therein is shown the curve of approximate radiant emittance (fire excitance in watts/cm$^2$-micrometer) of a hydrocarbon fire after Linford, et al. The radiant emittance has the characteristics of a 1600 degree Kelvin blackbody with superimposed "spikes" of radiation at 0.31, 2.7 and 4.4 micrometers. This curve is typical of the distribution of radiant energy produced by a fire which the system 10 will simulate.

Referring to FIG. 4, therein is depicted the measured radiant emittance of radiation 42 from an embodiment of the blackbody source 40. The basic curve is approximately that of a 500 degree Kelvin blackbody. $CO_2$ and $H_2O$ emissions at about 2.7 and 4.4 micrometers are prominently superimposed on the curve. Increasing the current supplied to the blackbody will raise its temperature changing the shape of the basic curve in accordance with the well-known Planck's Radiation Law.

Figures 5, 6:
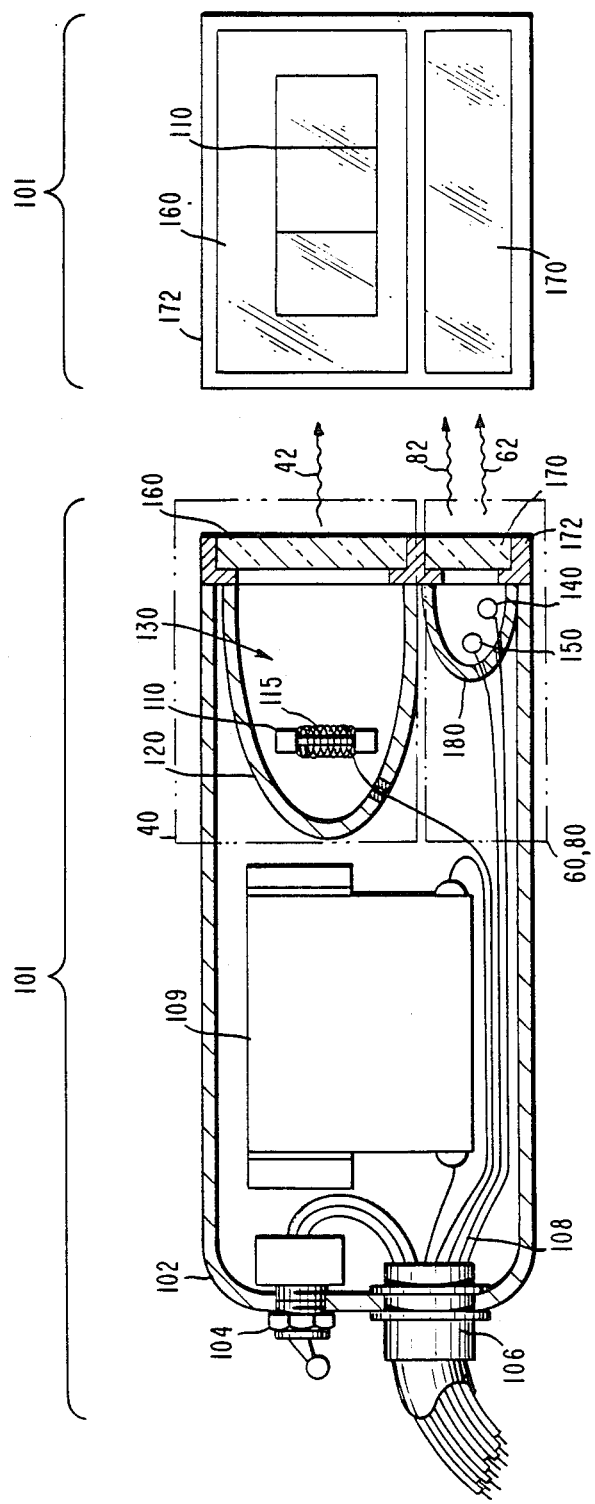
FIG. 5 is a front elevation view of a housing enclosing radiation sources of the disclosed Universal Fire Simulator of FIG. 1.
FIG. 6 is a side elevation cross-sectional view of a radiation "head" enclosing radiation sources of the disclosed Universal Fire Simulator of FIG. 1, depicting a general arrangement of an infrared radiation source, an ultraviolet radiation source, an ignition simulation source, a mode-selection switch and a high-voltage storage capacitor for the ignition simulation source.

Referring now to FIGS. 5 and 6, in conjunction with FIG. 1, therein is illustrated a preferred arrangement of the disclosed Universal Fire Simulator apparatus which may be transported to the site of the fire sensing system being tested. The blackbody source 40, ultraviolet source 60 and discharge tube source 80 may be packaged together with several electrical circuit components into a radiation head 101 that will fit into the palm of the operators hand.

The radiation head 101 includes a housing 102 which is a drawn or cast, elongated metal box closed at one end and having dimensions of approximately 1½ inches high 1½ inches wide and 3 inches long. To the open end of the housing 102 is attached a frame 172 into which is mounted an upper optical window 160 and a lower optical window 170.

The upper window 160 is rectangular and is mounted with its long dimension along the width and its short dimension along the height of housing 102. It serves as a window for a blackbody cavity 120. The upper window 160 is made from material which is transparent to radiation in the visible and infrared spectral regions, for example, zinc selenide (ZnSe). The upper window 160 encloses about the upper five-sixths of the open end of housing 102.

The lower optical window 170 is rectangular and is mounted below and parallel to the upper window 160 in the frame 172. It encloses the remaining one-sixth of the open end of housing 102. The lower window 170 serves as the window for the ultraviolet cavity 180 and is made from material which is transparent to radiation in the visible and ultraviolet spectral regions, for example, quartz.

The blackbody cavity 120 is attached to the frame 172, behind the upper window 160 and extends into the interior space of the housing 102. The blackbody cavity 120 is roughly parabolic in cross section in the side elevation. In front elevation cross section, the cavity 120 is rectangular. The sides of the cavity 120 are closed by plates.

The blackbody coil assembly 110 is mounted inside the cavity 120 at the approximate focus of the parabolic shape. The axis of the assembly 110 is disposed parallel to the long dimension of the cavity in the front elevation. In the side elevation, the parabolic cross section of the cavity 120 tends to gather the radiation from coil assembly 110 into a more or less parallel beam. The coil assembly 110 includes a coil of heating wire 115, for example nichrome wire, wound upon an insulating form. One or more coil assemblies 110 may be mounted with high-temperature cement within the cavity 120, depending on the energy required to be presented to the fire sensing system under test.

A typical fire sensing system must react to a hydrocarbon fire contained in a 14-inch diameter pan at a distance of 60 inches. A blackbody source 40 having about one square centimeter emitting area and positioned at a distance of two centimeters from the fire sensing system's detector will simulate the irradiance from such a fire. A larger blackbody source 40 of, say 20 square centimeters emitting area such as depicted in FIGS. 5–6, could be positioned at a distance of about 4.5 centimeters from the fire sensing system's detector.

The cavity 120 is hermetically sealed to the window 160 and frame 172 and is back-filled with a gas mixture 130 at room pressure. The mixture 130 is carbon dioxide, water vapor and nitrogen. Nitrogen is used instead of air as a basis of the gas mixture 130 to reduce the oxidation of the blackbody source 40 components. Electrical leads which supply current to the coil assembly 110 are passed through the wall of the cavity 120 by use of conventional, hermetically sealed, feed-through insulators.

Commercial blackbody devices generally have high emissivity cavities for efficient operation. However, in the present embodiment, high emissivity is not required because the signal produced by the heating wire coil is sufficiently large at the short distances at which the apparatus is placed from the fire sensing system under test. Emissivity may be increased, if desired, by proper blackening of the inside of reflector 120, blackening of heater assembly 110, or both.

A reflector 180 is mounted to the frame 172 behind the lower window 170 and extends into the interior space of the housing 102. Within the reflector are mounted a commercially obtainable ultraviolet bulb 140 and commercially obtainable gas discharge tube 150. The reflector 180 is smaller than the cavity 120 but has a similar parabolic profile in the side elevation. The reflector 180 is rectangular in cross section in the front elevation and has closed sides. The reflector 180 does not require hermetic sealing because the ultraviolet bulb 140 and gas discharge tube 150 are themselves sealed.

Electrical leads which supply current to the ultraviolet bulb 140 and gas discharge tube 150 are fed through the reflector 180 and join the wires leading away from the cavity 120. The electrical leads are formed into a wire bundle 108 leading out of the housing 102 through a connector 106 at the closed end of the housing. A mode switch 104 which provides for selection of the sequence and timing of the transmitters 100, 200, 300, is mounted on the closed end of the housing 102 and electrical leads which connect the mode switch 104 to the on-off control circuit 12 also join the wire bundle 108.

Still referring to FIGS. 5-6 in conjunction with FIG. 1, the preferred arrangement of the radiation head 101 contains a high-voltage storage capacitor 109 which is part of the high voltage source 70 which is used to "flash" the explosion-simulating discharge tube 150. The storage capacitor 109 is mounted inside the housing 102 in the space between the cavity 120 and the closed end of the housing 102. Leads from the storage capacitor 109 join the wire bundle 108.

The wire bundle 108 is connected by suitable cabling to the power amplifiers 30, 50, the high voltage source 70, the low-frequency white noise generator 20 and the on-off control circuit 12 which are located remotely from the radiation head 101.

In normal use, the radiation head 101 is disposed in the field of view of the fire sensing system under test and within a few centimeters of a detector window of such system. The gains of the first and second power amplifiers 30, 50 are preset to produce the desired ratio of respective radiation outputs 42, 62 from the blackbody source 40 and ultraviolet source 60. The mode switch 104 is set to select the desired sequencing of the sources 40, 60, 80 and the on-off control circuit 12 is energized.

Although the invention has been described in detail with reference to a particular embodiment, persons possessing ordinary skill in the art to which this invention pertains will appreciate that various modifications and enhancements may be made without departing from the spirit and scope of the invention.

What is claimed is:

1. An apparatus for simulating a fire-like environment comprising:
    (a) first radiant energy means for generating and transmitting energy having a blackbody spectral distribution;
    (b) second radiant energy means for generating and transmitting energy in infrared emission bands; and
    (c) third radiant energy means for generating and transmitting energy in ultraviolet and visible radiation bands.

2. The apparatus of claim 1 in which said first radiant energy means and second radiant energy means are combined to provide means for simultaneously generating, within the same blackbody cavity, radiant energy having a blackbody spectral distribution and energy having characteristic emission lines of certain gases.

3. The apparatus of claim 2 wherein the combined first and second radiation means includes a sealed reflecting cavity having a transparent aperture, containing a mixture of gases including carbon dioxide and nitrogen, and further including a coil of wire heated by a modulating electric current to the temperature of a fire.

4. The apparatus of claim 3 in which said gas mixture additionally includes water vapor.

5. The apparatus of claim 3 in which said third radiant energy means includes an electrically discharged fluorescent-type bulb without a fluorescent coating.

6. The apparatus of claim 1 further including simulation means for generating and transmitting energy having an ignition-flash radiation signature.

7. The apparatus of claim 6 wherein the ignition-flash radiation signature from the simulation means is that of a munitions flash.

8. The apparatus of claim 6 wherein said simulation means includes an electrically-fired gas discharge tube.

9. Fire simulating apparatus for simulating static and dynamic radiation attributes of a fire comprising:
    (a) blackbody radiation means for generating and transmitting energy having a blackbody spectral distribution in the visible and infrared spectral regions;
    (b) emission band radiation means for generating and transmitting energy in the infrared emission bands associated with certain gases which are the products of combustion;
    (c) ultraviolet spectral radiation means for generating and transmitting energy in a discrete ultraviolet spectral band; and
    (d) electrical modulating means for modulating the said blackbody radiation means, emission band radiation means, and ultraviolet spectral radiation means to simulate a fire's flicker.

10. The apparatus of claim 9 in which said blackbody radiation means and carbon dioxide and water vapor radiation means are combined to provide means for simultaneously generating, within the same blackbody cavity, radiant energy having blackbody spectral distribution and energy having characteristic emission bands or carbon dioxide.

11. The apparatus of claim 10 wherein said combined radiation means also provides radiant energy having the characteristic emission bands of water vapor.

12. The apparatus of claim 9 further including ignition-flash simulation means for generating and transmitting energy having an ignition-flash radiation signature.

13. The apparatus of claim 12 wherein the ignition-flash radiation signature of said ignition-flash simulation means is that of a munitions flash.

14. An apparatus for providing emitted radiation simulating a fire comprising:
    (a) a blackbody source for radiating energy in the visible and infrared spectrum, having a coil of heating wire sealed within a reflecting cavity having a transparent aperture, said cavity containing a mixture of gases including gases which are the products of combustion;
    (b) an ultraviolet radiation source for radiating energy in the ultraviolet spectrum;
    (c) a gas discharge tube source for simulating an ignition flash;
    (d) reflectors and apertures for gathering and directing radiant energy emitted by said ultraviolet and ignition-flash radiation sources; and
    (e) a noise generator and first and second power amplifiers for producing electrical waveforms for simultaneously heating said blackbody radiation source to the temperature of a fire, heating the gases contained within the blackbody cavity to emission temperature, and driving the ultraviolet radiation source, all in time-varying amplitude to simulate a fire's flicker.

15. The apparatus of claim 14 in which the said ultraviolet radiation means includes an electrically discharged fluorescent-type bulb without a fluorescent coating.

16. The apparatus of claim 14 wherein said ignition flash has a radiation signature of a munitions flash.

17. The apparatus of claim 14 wherein the gases contained in said cavity include carbon dioxide and nitrogen.

18. The apparatus of claim 17 wherein said gases further include water vapor.

19. Fire simulation method for testing current and projected technology fire sensor systems, comprising the steps of
    (a) generating blackbody-source radiant energy in the visible and infrared spectral regions;

(b) generating gaseous emission source radiant energy in infrared emission bands associated with gases which are products of combustion;

(c) generating ultraviolet-source radiant energy in a discrete ultraviolet radiation band; and (d) supplying a modulating electrical current to excite said blackbody source, ultraviolet source, and gaseous emission source to energy radiating states simulating time-varying radiation emitted by an actual fire.

20. Fire simulation method disclosed in claim 19 further comprising the step of simulating an explosion-flash by discharging a gas discharge tube with an electrical pulse having the radiation signature of an ignition flash.

21. Fire simulation method disclosed in claim 19 in which said blackbody-source, and gaseous emission-source radiant energy generation is simultaneously and conveniently done by electrically heating a coil of heating wire in a sealed cavity containing a gas mixture including carbon dioxide and nitrogen gases.

22. Fire simulation method disclosed in claim 21 wherein said gas mixture further includes water vapor.

23. Fire simulation method disclosed in claim 19 in which the generation of ultraviolet radiation energy is accomplished by electrically discharging a fluorescent-type bulb without a fluorescent coating.

24. Fire simulation method for testing the operation of fire sensor systems with radiant energy approximating the distinguishing spectral and temporal characteristics of a fire, comprising the steps of:

(a) heating, to the temperature of a fire, a coil of wire sealed in a cavity having a transparent aperture and containing a mixture of gases, including carbon dioxide and nitrogen, to produce emitted radiant energy having blackbody spectral distribution and emissions in the narrow spectral bands associated with carbon dioxide, the heating being accomplished with a modulating electric current.

(b) electrically powering an ultraviolet bulb concurrently with said heating step, by a modulating current to produce time-varying, emitted radiant energy having ultraviolet spectral distribution indicative of a fire.

25. The method of claim 24, further comprising the step of electrically firing a gas discharge tube to produce radiation simulating an ignition flash during or before said heating step.

26. The method of claim 25 where said ignition flash simulation is accomplished by discharging a gas discharge tube with an electrical pulse having the radiation signature of a munitions flash.

27. The method of claim 24 where said gas mixture additionally includes water vapor, to produce radiation having characteristic emission bands of water vapor;

28. The method of claim 24 where said heating current is modulated from 0 to approximately 100 Hertz.

* * * * *